Aug. 6, 1929.                E. F. W. ALEXANDERSON                 1,723,906
                              SYSTEM OF SHIP PROPULSION
                                  Filed Jan. 2, 1923
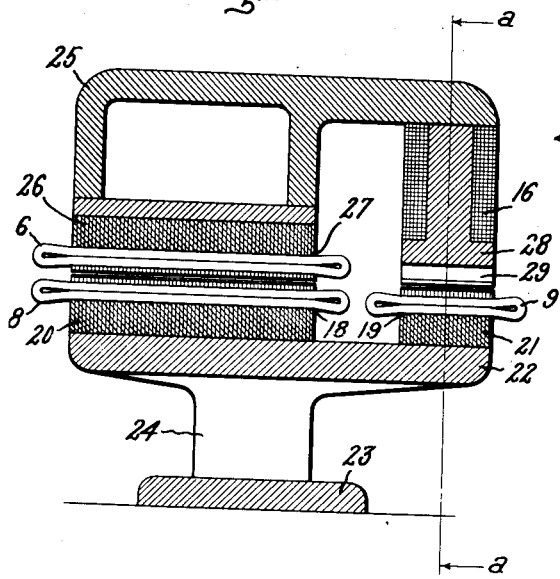
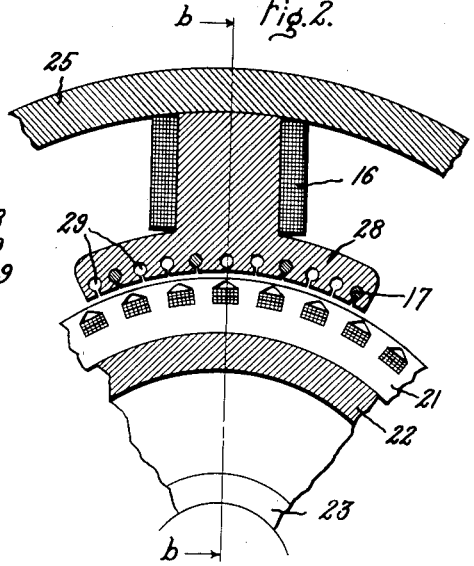
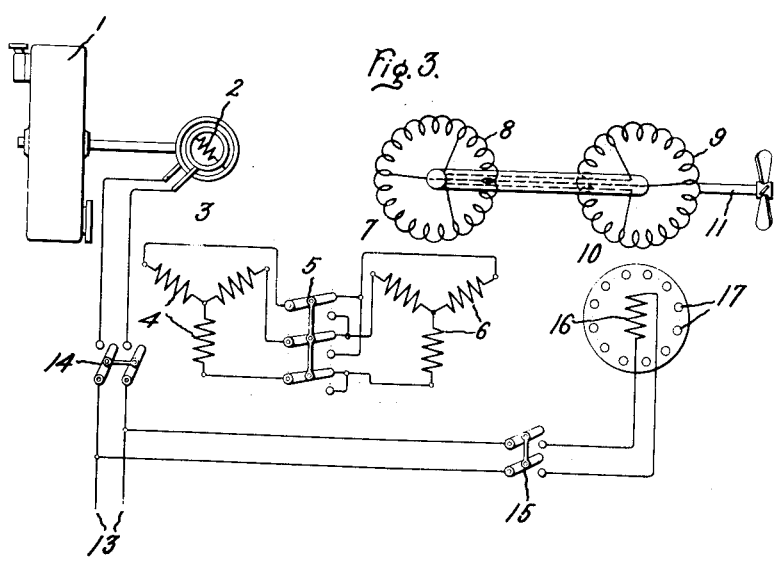
Inventor:
Ernst F. W. Alexanderson,
by *Alexander S. [signature]*
His Attorney.

Patented Aug. 6, 1929.

1,723,906

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

SYSTEM OF SHIP PROPULSION.

Application filed January 2, 1923. Serial No. 610,104.

My invention relates to systems of ship propulsion, and especially to an improved system of electric ship propulsion wherein a steam turbine is used to drive a generator which supplies energy to a driving motor mechanically associated with the ship's propeller shaft.

In the operation of ship propulsion systems which utilize a steam turbine as the prime mover, difficulty has been encountered because of the great difference between the speed at which the turbine operates most efficiently and that at which the best operation of the propeller is obtained. The optimum speed of a steam turbine is comparatively high. It is considered desirable in many cases to operate the turbine at a speed in the neighborhood of 5000 R. P. M. At this speed a bipolar generator supplies energy at 83 cycles per second to the driving motor which must operate at about 90 R. P. M. in order to secure the best operation of the propeller. The operation of the driving motor at a speed of 90 R. P. M. on an 83 cycle system, however, is objectionable in that the diameter of the motor must be unduly increased to accommodate the large number of poles required.

An object of my invention, therefore, is to provide an improved system of ship propulsion.

A further object is to provide a new motor aggregate particularly fitted for operation under the conditions which obtain in ship propulsion.

Other objects and advantages will appear as my invention is considered in detail.

My invention will be better understood from the following description taken in connection with the accompanying drawing and its scope will be pointed out in the appended claims.

In the accompanying drawing, Fig. 1 is a sectional view taken on the line b—b of Fig. 2 to show a part of the motor aggregate, Fig. 2 is a similar view taken on line a—a of Fig. 1, and Fig. 3 is a diagrammatic view designed to show the arrangement of the system as a whole.

Referring now to the drawing, there is shown an adjustable speed turbine 1 arranged to rotate the field winding 2 of a generator 3, from the armature winding 4 of which electric energy may be supplied through the reversing switch 5 to the primary winding 6 of the induction motor 7. The secondary winding 8 of the induction motor 7 and primary winding 9 of the synchronous motor 10 are electrically interconnected with each other through suitable leads and are both arranged to rotate with the propeller shaft 11 thereby obviating the necessity of slip rings and permitting the operation of the synchronous motor 10 at the comparatively low slip frequency of the induction motor 7. The cascade connection between the induction and synchronous motors is of advantage in that it permits the use of a synchronous motor primary winding similar to the usual induction motor secondary winding. This winding comprises comparatively few turns, is adapted to be operated by large current supplied at low voltage and may readily be placed in closed slots thereby materially reducing the air-gap flux pulsations. The use of closed slots not only, due to the elimination of air-gap pulsations, makes possible the use of solid steel pole pieces and a uniform small air-gap of the same size as that of the induction motor thereby producing good magnetizing characteristics and insuring good starting torque, but also increases the effective air-gap area and thus reduces the amount of magnetizing current required.

As shown in Figures 1 and 2, the secondary winding 8 of the induction motor 7 and the primary winding 9 of the synchronous motor 10 are placed in suitable slots 18 and 19 formed in the laminated rotor cores 20 and 21 respectively, these cores being mounted on a member 22 connected to the hub 23 through the spokes 24. A yoke 25 is arranged to support the laminated stator core 26 provided with slots 27 in which is placed the primary winding 6 of the induction motor 7. Also supported by the yoke 25 are the solid steel pole pieces 28 upon which is placed the exciting winding 16. The use of solid steel pole pieces is of particular advantage, in that the slip energy during induction motor operation is largely developed in the body of the pole pieces from whence it is readily dissipated, and in that the skin effect is utilized to give high resistance characteristics at starting when the frequency of the current induced in these pole pieces is comparatively high.

If it is desired to modify the skin effect characteristics of the solid steel pole pieces so as to give a higher synchronous torque, a squirrel cage winding 17 may be placed near the faces of the pole pieces, the desired combination of short circuiting effect by the squirrel cage winding and skin effect in the pole pieces being regulated by the number of bars in the squirrel cage winding.

A suitable source of direct current 13 may be provided for supplying the necessary excitation to the field winding 2 of the generator 3 and the field winding 16 of the synchronous motor 10 through switches 14 and 15 respectively.

Longitudinal holes 29 through the pole pieces 28 are provided near the pole faces for the purpose of controlling the air-gap flux distribution and supporting the squirrel cage winding 17. These holes are spaced so that the iron between them is restricted to give the desired degree of magnetic saturation, the holes near the corners of the pole pieces being drilled more closely than at the middle with a view of producing approximately a sine wave distribution of flux.

Advantage is thus taken of the peculiar requirements of ship propulsion by departing from the usual design of synchronous motors in such a way as to particularly fit this synchronous-induction motor aggregate for use in the propulsion of ships.

What I claim as new and desire to secure by Letters Patent of the United States, is:—

1. A concatenated induction-synchronous motor aggregate, the synchronous motor having solid metal pole pieces and a core member provided with closed slots, the primary winding of said synchronous motor being placed in said slots.

2. In combination, an induction motor and a synchronous motor, the secondary winding of said induction motor being connected to the primary winding of said synchronous motor whereby said induction and synchronous motors form a concatenated aggregate, said synchronous motor having solid metal pole pieces to produce at starting a high effective resistance in the secondary of said induction motor.

3. A concatenated induction-synchronous motor aggregate, the synchronous motor having a core member provided with closed slots in which the primary winding is placed, said synchronous motor being provided with solid pole pieces in the faces of which are provided a series of longitudinal holes arranged to produce an approximate sine wave distribution of flux over the pole faces.

4. A synchronous-induction motor aggregate comprising a rotor core provided with closed slots, an induction motor having its secondary winding arranged to rotate with said rotor core, and a synchronous motor having its primary winding wound in said slots, the stator of said synchronous motor being provided with solid metal pole pieces perforated to produce an approximate sine wave distribution of air gap flux.

5. A synchronous-induction motor aggregate comprising a rotor core provided with closed slots, an induction motor having its secondary winding arranged to revolve with said rotor core, a synchronous motor having its primary winding wound in said slots and having stationary pole pieces of solid metal perforated to produce an approximate sine wave distribution of air gap flux, and a high resistance squirrel cage winding in certain of said perforations.

In witness whereof, I have hereunto set my hand this 29th day of December, 1922.

ERNST F. W. ALEXANDERSON.